United States Patent [19]

Bijen

[11] 4,454,285

[45] Jun. 12, 1984

[54] METHOD FOR PREPARING GLASS-FIBER REINFORCED CEMENT COMPOSITES

[75] Inventor: Jan M. J. M. Bijen, Munstergeleen, Netherlands

[73] Assignee: Stamicarbon B.V., Geleen, Netherlands

[21] Appl. No.: 414,800

[22] Filed: Sep. 3, 1982

Related U.S. Application Data

[63] Continuation of Ser. No. 111,298, Jan. 11, 1980, abandoned, which is a continuation of Ser. No. 937,842, Aug. 29, 1978, abandoned.

[30] Foreign Application Priority Data

Aug. 30, 1977 [NL] Netherlands .......................... 7709521

[51] Int. Cl.³ .............................................. C08K 3/34
[52] U.S. Cl. ........................................................ 524/5
[58] Field of Search ......................................... 524/3, 5

[56] References Cited

U.S. PATENT DOCUMENTS

| | | | |
|---|---|---|---|
| 3,196,122 | 7/1965 | Evans | 524/5 |
| 3,360,493 | 12/1967 | Evans | 524/5 |
| 4,002,713 | 1/1977 | Duncan | 524/5 |
| 4,077,809 | 3/1978 | Plunguian | 524/5 |
| 4,147,555 | 4/1979 | Cohen | 524/5 |

*Primary Examiner*—Paul R. Michl
*Attorney, Agent, or Firm*—Cushman, Darby & Cushman

[57] ABSTRACT

A modified reinforced non-porous cement composition and composite and the process of preparing same whereby the composites are reinforced using synthetic mineral fibers, such as glass and E-glass fibers. The cement includes a resin dispersion of a polymer, containing acid groups, with a mean particle size ranging from 0.05 and 5.0 microns and the resin dispersion protects the reinforcing fibers from alkaline attack. The water to cement ratio ranges from 0.2 to 0.5 and the weight ratio of the resin to the cement ranges from 0.02 to 0.4. Preferably, the resin dispersion is a thermoplastic resin prepared from monomers containing vinyl groups and the acid groups are preferably carboxyl groups.

11 Claims, No Drawings

METHOD FOR PREPARING GLASS-FIBER REINFORCED CEMENT COMPOSITES

This is a continuation of application Ser. No. 111,298, filed on Jan. 11, 1980, now abandoned, which is a continuation of application Ser. No. 937,842, filed on Aug. 29, 1978, now abandoned.

The invention relates to a process of preparing a composite from a water-hardening cement, synthetic mineral fibers and a resin dispersion.

The use of synthetic mineral fibers, particularly glass fibers, as a reinforcement in water-hardening cement has already been proposed, in view of the high strength of these fibers, their relative inertness with respect to organic attack, and their resistance to rotting and fungi, and in view of the non-combustibility of such a system. However, water-hardening cements are so strongly alkaline that they attack the fibers.

Several solutions to this problem have been proposed, e.g. modifying the cement by chemical conversion of the damaging alkaline components with a cation exchanger, to reconstitute such components to a form in which they do not attack, for instance, glass, or coating the glass fibers with substances which are not themselves liable to attack by alkalis, to protect the glass fibers from the alkaline attack. It has also been proposed to use special cements, such as magnesium-oxysulphate or aluminium cement, to reduce the possibility of the glass fibers being attacked by alkalis. Also, use is made of expensive alkali-resistant glass fibers to prevent the deterioration in mechanical properties. Like the others, this measure does not satisfy expectations.

According to Netherlands Patent Application No. 6707994 this problem can be solved by modifying three parts by weight of a hydraulic cement with four parts by weight of an acrylic or butadiene/styrene resin dispersion which is stable under alkaline conditions. The acrylic or butadiene/styrene resin dispersions used have a solids content of 3-30% wt. The water/cement factor applied when manufacturing products will then be 0.9 at the minimum. This results in objects made of this material being highly porous and showing strong shrinkage during hardening. This high shrinkage causes crack formation. In consequence, the material will be unusable for applications in which water impermeability is an important requirement.

It has now been found that if use is made of a cement-containing mortar with a water/cement factor of between 0.2 and 0.5, resin compositions are capable of strongly reducing the fall-off in strength and/or bending resistance of the said composites containing synthetic mineral fibers. In certain cases to be mentioned later it is possible even for considerable increase in strength to occur. It has further been found that non-porous composites showing little shrinkage can be prepared with excellent bending and impact resistance values even increasing with time.

Consequently, the invention relates to a process of preparing a composite with the aid of a resin dispersion consisting of a dispersion of a polymer containing acid groups which has a mean particle size of between 0.05 and 5 microns, the water/cement ratio in the water-hardening mass being between 0.2 and 0.5, and the weight ratio of resin with respect to cement being between 0.02 and 0.4.

The mortars applied according to the invention are excellently workable in spite of the lower water/cement factor and the presence of the acid groups.

Preference is given in particular to polymer resins prepared from monomers containing vinyl groups. According to the invention, the polymer resins should contain acid groups, e.g. phosphoric-acid or sulphonic-acid groups, and, very particularly, carboxyl groups. These carboxyl groups may derive from built-in mono-unsaturated acids, such as acrylic acid, methacrylic acid, fumaric acid, itaconic acid, crotonic acid, or semi-esters of maleic acid, fumaric acid or itaconic acid; they may also have been grafted onto the polymer. Further, they may be formed by modification, in particular by oxidation or saponification of certain polymers. Preference is given, however, to carboxyl groups deriving from mono-unsaturated monomers containing one or more carboxyl groups and copolymerized with the resin. To achieve optimum results, these monomers are preferably incorporated in an amount of 2.5 to 30% by weight with respect to the polymer. Very good results are obtained if the percentage of unsaturated monomer containing carboxyl groups is 5-25% by weight in particular 10-20% by weight.

For the rest, the polymers consist of vinyl monomers such as styrene, α-methyl styrene, vinyl chloride, cyclohexyl methacrylate, acrylonitrile, vinyl acetate, vinyl versatate, methyl methacrylate, ethyl, butyl and hexyl acrylate, dibutyl fumarate, or dibutyl maleate, methyl vinyl ether, ethylene and propylene.

For achieving optimum properties it is desirable to use a water/cement factor of between 0.2 and 0.4.

A special advantage of the present invention is the possibility of bringing about rapid hardening by applying elevated temperatures. This has been found to effect an increase of strength with time. In addition, the surface of the hardened object does not show any cracks. These properties are all the more remarkable because in unmodified cement reinforced with synthetic fibers bending resistance and crack formation are unfavourable affected by accelerated hardening. Furthermore, the hardening conditions in particular the relative humidity, are very critical with this unmodified cement. In particular, therefore, at least part of the hardening process is made to take place at a temperature of between 35° and 100° C., in particular between 50° and 95° C. The relative humidity is now little critical, but it is preferred to apply a relative humidity of between 40 and 80%.

The mean particle size of the dispersion applied is preferably between 0.05 and 1.5 microns, in particular between 0.1 and 0.75 micron.

The cement mortar used in accordance with the invention may contain up to 40% by volume of filling agents, e.g. sand, which should preferably have a maximum particle diameter of about 500 microns, however.

The quantity of synthetic mineral fibers, in particular glass fibers, is not critical; the maximum is 40% by volume, preference being given, however, to quantities up to 10% by volume, in particular 5 to 10% by volume. Neither the fiber length is critical, although as a rule it is 1 to 5 cm.

The invention will now be elucidated by means of examples.

EXAMPLE I

A cement mortar was prepared by mixing the following components:

| | |
|---|---|
| Portland cement B | 1 part by weight |
| Polymer dispersion | 0.3 part by weight |
| E-Glass fibres (1–5 cm long) | 4.5% by vol. |

Water was added to this mixture so that the water/cement factor of the mortar came to be 0.28.

The dispersion, consisting of a copolymer of 10% wt. methacrylic acid, 50% wt. styrene, and 40% wt. butyl acrylate dispersed in water, had a mean particle size of 0.5 micron and a solids content of 50% wt.

From this mortar test bars were made measuring $2.5 \times 1.0 \times 19$ cm, which were hardened at 20° C. and 80% rel. humidity. The resulting test bars were taken from the form after 1 day and examined for both bending resistance (ASTM V 790) and Charpy impact resistance. The results were as follows:

| Hardening time | Bending resistance $N/mm^2$ | Impact resistance $N\ mm/mm^2$ |
|---|---|---|
| 14 days | 25 | 26 |
| 28 days | 35 | 27 |
| 60 days | 37 | 29 |
| 80 days | 37 | 35 |
| 1 year | 36 | 37 |

COMPARATIVE EXAMPLE

Example I was repeated, with the difference that the dispersion used was replaced by a copolymer of methyl methacrylate and 2-ethyl hexacrylate. The results were as follows:

| Hardening time | Bending resistance $N/mm^2$ | Impact resistance $N\ mm/mm^2$ |
|---|---|---|
| 7 days | 24.2 | 17 |
| 14 days | 25.1 | 14 |
| 28 days | 21.8 | 9 |
| 60 days | 22.0 | 9 |
| 180 days | 22.2 | 8 |

EXAMPLE II

Example I was repeated as regards composition, but now hardening took place immediately after preparation, at 80° C. and 65% rel. hum. The test bars were taken from their forms after 2½ hours and then stored at 20° C. and 65% rel. hum. The results were as follows:

| Hardening time | Bending resistance $N/mm^2$ | Impact resistance $N\ mm/mm^2$ |
|---|---|---|
| 4 hours | 4.0 | 30 |
| 7 days | 18.0 | 27 |
| 1 month | 28.0 | 26 |
| 2 months | 34.0 | 25 |

EXAMPLE III

Example II was repeated, with aluminium cement (Ciment Fondu) being used instead of Portland cement. De-forming was done after 1½ hours. The results were as follows:

| Hardening time | Bending resistance $N/mm^2$ | Impact resistance $N/mm/mm^2$ |
|---|---|---|
| 4 hours | 8 | 30 |
| 7 days | 21 | 25 |
| 1 month | 29 | 25 |

-continued

| Hardening time | Bending resistance $N/mm^2$ | Impact resistance $N/mm/mm^2$ |
|---|---|---|
| 2 months | 37 | 25 |

Example I was repeated with dispersions consisting of 50% wt. styrene, methacrylic acid contents of between 10 and 20% wt., with the balance consisting of butyl acrylate. With this dispersion analogous results were obtained.

Example I was also repeated with the use of a so-called jet cement (rapidly hardening cement), containing $11CaO.7Al_2O_3.CaF_2$ as one of its components. De-forming took place after 1 hour. The results were analogous to those of the preceding examples.

What I claim is:

1. Process for manufacturing a non-porous cement composite comprising the steps of,
    (a) admixing a water hardening cement, glass fibers, a resin dispersion, and water, to form a cement mortar;
    (b) forming said mortar into a predetermined shape; and
    (c) hardening said mortar, wherein
        (i) said resin dispersion comprises a copolymer of about 10% to about 20% by weight of methacrylic acid, about 50% by weight styrene and the balance by weight of butyl acrylate dispersed in water, which resin has a mean particle size of between about 0.05 and about 5 microns;
        (ii) the ratio of said water to said water hardening cement ranges from about 0.2 to about 0.5;
        (iii) the weight ratio of said resin dispersion to said water hardening cement ranges from about 0.02 to about 0.4; and
        (iv) said glass fibers being present in an amount not exceeding about 40 percent by volume.

2. A process as in claim 1, wherein the glass fibers are present in an amount ranging from about 5% to about 10% by volume.

3. A process as in claim 1, wherein the glass fibers consist essentially of E-glass fibers.

4. A fiber reinforced concrete mixture of a non-porous nature comprised of a water-hardening cement mortar having a water/cement ratio ranging from about 0.2 to about 0.5, and a fiber reinforcing composition admixed directly with said cement mortar, said composition comprising glass fibers in an amount not exceeding about 40% by volume and a resin dispersion comprising a copolymer of about 10% to about 20% by weight of methacrylic acid, about 50% by weight styrene and the balance by weight of butyl acrylate dispersed in water, which resin has a mean particle size ranging between about 0.05 to about 5 microns, the weight ratio of the resin dispersion to the cement ranging from about 0.02 to about 0.4.

5. A concrete mixture as in claim 4, wherein the glass fibers are preferably present in an amount ranging from about 5% to about 10% by volume.

6. A concrete mixture as in claim 4, wherein the glass fibers consist essentially of E-glass fibers.

7. Process according to claim 1, characterized in that the water/cement ratio is between 0.2 and 0.4.

8. Process according to claim 1, characterized in that at least part of the hardening takes place at a temperature of between 35° and 100° C.

9. Process according to claim 1, characterized in that the mean particle size of the dispersed particles is between 0.05 and 1.5 microns.

10. Process according to claim 9, characterized in that the mean particle size is between 0.1 and 0.75 micron.

11. Process according to claim 1, characterized in that the quantity of mineral fibers is between 1 and 20% by weight.

* * * * *